(12) United States Patent
Sugata et al.

(10) Patent No.: US 6,582,167 B1
(45) Date of Patent: Jun. 24, 2003

(54) SPINDLE DEVICE OF MACHINE TOOL

(75) Inventors: Shinsuke Sugata, Fukuyama (JP);
Yoshihide Seo, Hiroshima-ken (JP);
Takashi Kobayashi, Fukuyama (JP)

(73) Assignee: Horkos Corp., Hiroshima-ken (JP)

( * ) Notice: Subject to any disclaimer, the term of this patent is extended or adjusted under 35 U.S.C. 154(b) by 0 days.

(21) Appl. No.: 10/030,245

(22) PCT Filed: Jul. 3, 2000

(86) PCT No.: PCT/JP00/04432
§ 371 (c)(1),
(2), (4) Date: Jan. 9, 2002

(87) PCT Pub. No.: WO01/03885
PCT Pub. Date: Jan. 18, 2001

(30) Foreign Application Priority Data

Jul. 9, 1999 (JP) .............................................. 11-196232

(51) Int. Cl.⁷ .............................. B23C 9/00; B23B 27/10
(52) U.S. Cl. .......................................... 409/136; 408/59
(58) Field of Search ................................ 409/136, 137, 409/231, 234, 134, 135; 408/57, 59, 56; 184/6.14, 6.26, 55.1

(56) References Cited

U.S. PATENT DOCUMENTS

| 5,676,506 A | * 10/1997 | Sugata ........................ 409/136 |
|---|---|---|
| 5,690,137 A | * 11/1997 | Yamada ....................... 137/240 |
| 5,755,537 A | * 5/1998 | Lubbering ..................... 408/3 |
| 5,762,454 A | * 6/1998 | Yamada ....................... 409/194 |
| 5,860,776 A | * 1/1999 | Sato et al. ..................... 91/178 |
| 5,984,595 A | * 11/1999 | Mizoguchi ................... 408/57 |
| 6,305,696 B1 | * 10/2001 | Sugata et al. ................. 279/20 |

FOREIGN PATENT DOCUMENTS

| JP | 62-15055 | * 1/1987 | ................ 409/137 |
|---|---|---|---|
| JP | 9-192963 | 7/1997 | |
| JP | 9-239637 | 9/1997 | |
| JP | 2000-736 | 1/2000 | |
| JP | 2000-158285 | 6/2000 | |

* cited by examiner

*Primary Examiner*—William Briggs
(74) *Attorney, Agent, or Firm*—Venable LLP; John P. Shannon

(57) ABSTRACT

A spindle device and a tool holder of a machine tool stably ejecting spray coolant from the tip of a tool (19) in a tool holder (18) and suppressing a waste of the spray coolant, wherein the tool holder (18) is fixed to the tip part of a spindle (2) mechanically detachably through clamp means (KR), an extension passage (104) is formed in the state that an in-spindle spray coolant passage (102) formed in the center part of the spindle (2) is formed to communicate with the in-holder spray coolant passage (103) through the extension passage (104).

4 Claims, 4 Drawing Sheets

SPINDLE DEVICE OF MACHINE TOOL

FIELD OF THE INVENTION

This invention relates to a spindle device of a machine tool spouting spray coolant from the tip of a tool.

BACKGROUND OF THE INVENTION

As to machining by machine tools, much coolant is supplied into machining points to cool and lubricate workpieces and tools, or to eliminate cutting chips. In this case, there are many problems, such as ill effects to an environmental pollution and human health due to coolant, high cost resulting from waste oil disposal of the coolant, shortening the life of a tool resulting from undercooling the workpieces, and sliding friction due to excessive coolant at a minute slitting of the tool. Besides, much coolant adheres to the cutting chips in machining, and therefore, when treating and recycling cutting chips, the adhesive coolant must be separated.

In recent years, to settle the above problems, there appear machine tools performing so-called dry cutting that cut as supplying spray into machining points. Here, the spray is formed from a very small quantity of coolant.

Applicant has already practiced machine tools for the dry cutting, for example, their spindle device is like FIG. 5 or FIG. 6.

First, an explanation about FIG. 5 will follow. Numeral 2 is a spindle, 7 is a draw-bar, and 11 is a clamp-rod. Here, the draw-bar 7 is provided in the center of the spindle 2, and the clamp-rod 11 is screwed on the tip of the draw-bar 7. Besides, an in-spindle spray coolant passage 102 is provided over both centers of the draw-bar 7 and the clamp-rod 11. Numeral 18c is a tapered interfitting axis of a tool holder 18, which is closely fitted into a tapered interfitted hole 5a provided in the tip of the spindle 2, pulled backward f2 by a collet 12, and comes to be in grasp. Numeral 14 is an atomizing nozzle for coolant, 103 is an in-holder spray coolant passage provided in the center of the tool holder 18. The front end of the passage 103 opens to the tip face of the tool fixed on the tool holder 18, and the rear end thereof opens to a bottom face of a cavity "b" provided in the center of the tapered interfitting axis 18c.

Next, an explanation about FIG. 6 will follow. A canister 25 is fixed at the center of the spindle 2, and a steel ball 26 is supported on a through hole 25a on a peripheral wall of the canister 25 so as to be displaced in radial direction. The steel ball 26 is pushed to a wedge-shaped cavity 27 in accordance with the backward displacement of the clamp-rod 11 combined with the draw-bar 7, displaced in outward radial direction of the canister 25, and fitted into a circular hole b1 provided on a peripheral wall of the tapered interfitting axis 18c of the tool holder 18, thereby pulling the tapered intermitting axis 18c backward f2. Hence, the tapered interfitting axis 18c comes to be in grasp. The others are same with those of FIG. 5.

In FIG. 5 or FIG. 6, spray coolant spouts from an outlet of the atomizing nozzle 14 within the spindle 2 into the in-spindle spray coolant passage 102. The spouted spray coolant flows into the cavity "b" of the tool holder 18 from the front opening of the clamp-rod 11, and then flows out the air from the tip of the tool through the in-holder spray coolant passage 103 and a spray coolant passage provided in the center of the tool fixed on the holder 18.

According to this kind of machine tool, even if the tool cuts deep position of a workpiece, its machining point is effectively lubricated by the spray coolant spouted from the tip of the tool. Accordingly, cutting is rationally accomplished.

However, according to the above conventional machine tool, the spray coolant reached the inside of the cavity "b" of the tool holder 18 flows out the air through an opening between parts. Therefore the coolant is wasted.

Besides, since the cavity "b" has a comparative large diameter in comparison with its front and back passages, the spray coolant reached the cavity "b" is liquefied. The liquefaction hinders the coolant from being stably supplied to the machining point of the workpiece, and does harm to a response to start or stop spouting the spray coolant from the tip of the tool.

Objects of the present invention are to provide a spindle device of a machine tool which can settle the above problems.

SUMMARY OF THE INVENTION

To achieve the above objects, in a spindle device of the present invention, as shown in claim 1, a machine tool fixs mechanical-detachably a tool holder on the tip of a spindle by collet-clamping means. A mouthpiece member in a fixed length is protrudently installed on the bottom face of a cavity formed in the center of the tool holder with a screw. A gas-liquid passage, an atomizing means and an in-spindle spray coolant passage are provided in the center of a draw-bar of a spindle side clamping means. The atomizing means comprises an atomizing nozzle and a compressed air supplying valve. The atomizing nozzle mixes and stirs coolant and compressed air which are supplied from the outside of the spindle through the gas-liquid passage, and generates spray coolant. When pressure of the spray coolant spouted into the in-spindle spray coolant passage in front of the nozzle falls, the compressed air supplying valve is displaced forward a little, and directly blows the compressed air within a compressed air passage into the spray coolant. The in-spindle spray coolant passage is formed from an inner hole of the compressed air supplying valve, and contacts on the rear end of the mouthpiece member of the above tool holder.

Accordingly, the in-spindle spray coolant passage, the in-holder spray coolant passage, and the extension passage are hardly different in their diameters, and are closely communicated with each other. Therefore, the spray coolant passing these passages is prevented being liquefied by vast differences between their diameters, and stably spouting from the tip of a tool of the tool holder. Besides, since these passages are closely connected, the spray coolant is prevented flowing out the air in vain through an opening between parts. Moreover, since the extension passage is provided to the tool holder, a structure of the conventional spindle side can be used as it is.

This invention can be materialized as follows.

That is, as shown in claim 2, an external form of the compressed air supplying valve is formed in one having level difference of a large diameter portion and a small diameter portion. The small diameter portion is located in an central hole of a joint screw fitted in an inner hole of a clamp-rod of the clamping means. A spring is provided between the joint screw and the level difference, and presses the compressed air supplying valve to the atomizing nozzle side.

In this case, as shown in claim 3, when fastening the tool holder, the tip of the small diameter portion of the compressed air supplying valve is partially inserted into the rear end of the mouthpiece member of the tool holder.

Moreover, in the tool holder of the present invention, the extension passage is provided in the center of the bottom face of a comparative large diameter cavity provided on a tapered intermitting axis in the state that the in-holder spray coolant passage provided in the center of a holder body is extended backward. Accordingly, conventional clamping means can be almost used as it is.

In this case, the extension passage may be provided so as to go in and out in its longitudinal direction, as well as so as to be pressed backward by spring force.

PREFERRED EMBODIMENT OF THE PRESENT INVENTION

Figure 1:
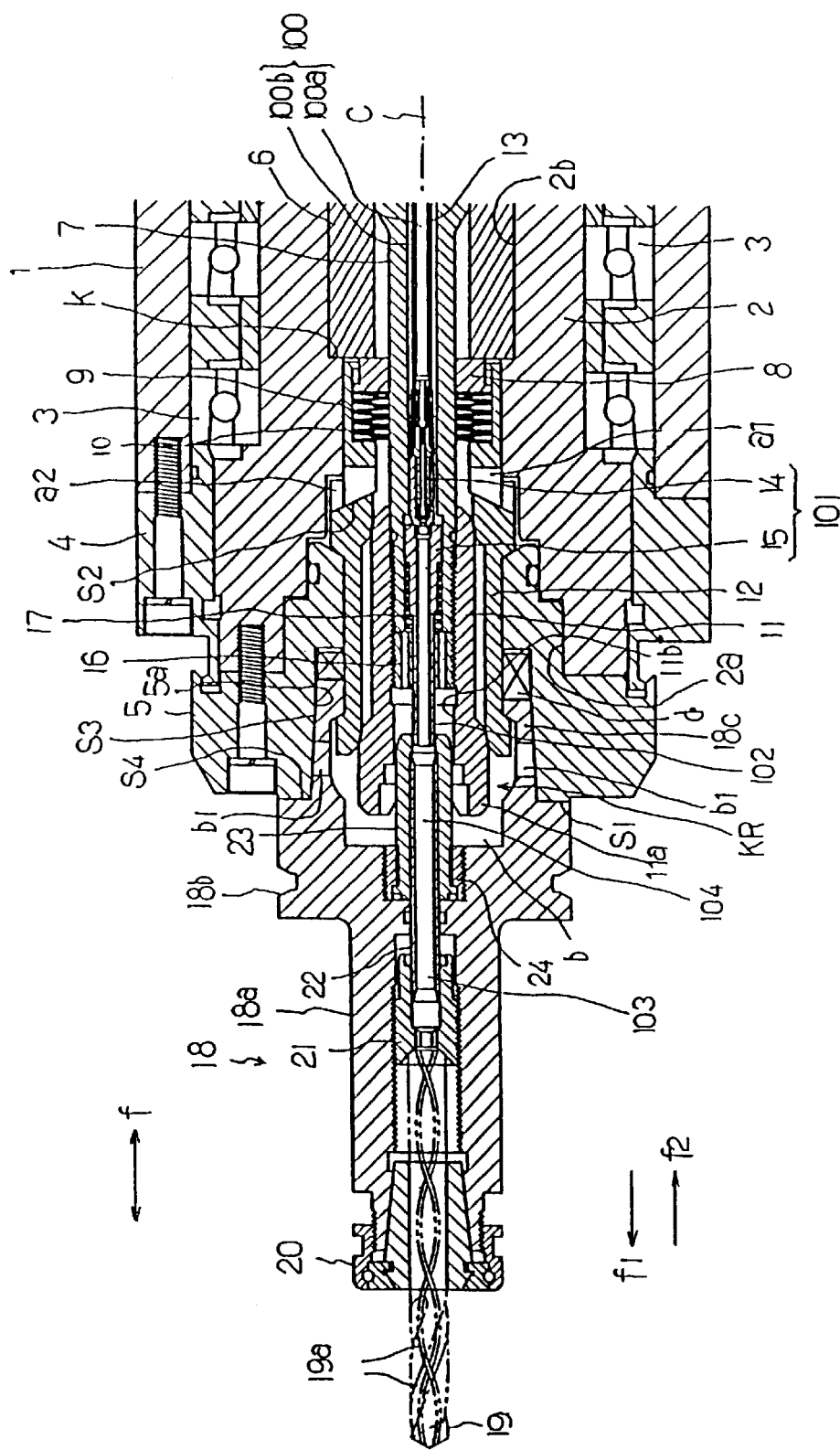
FIG. 1 is a sectional view at side sight of a spindle device of a machine tool related to an embodiment of the invention.
Figure 2:
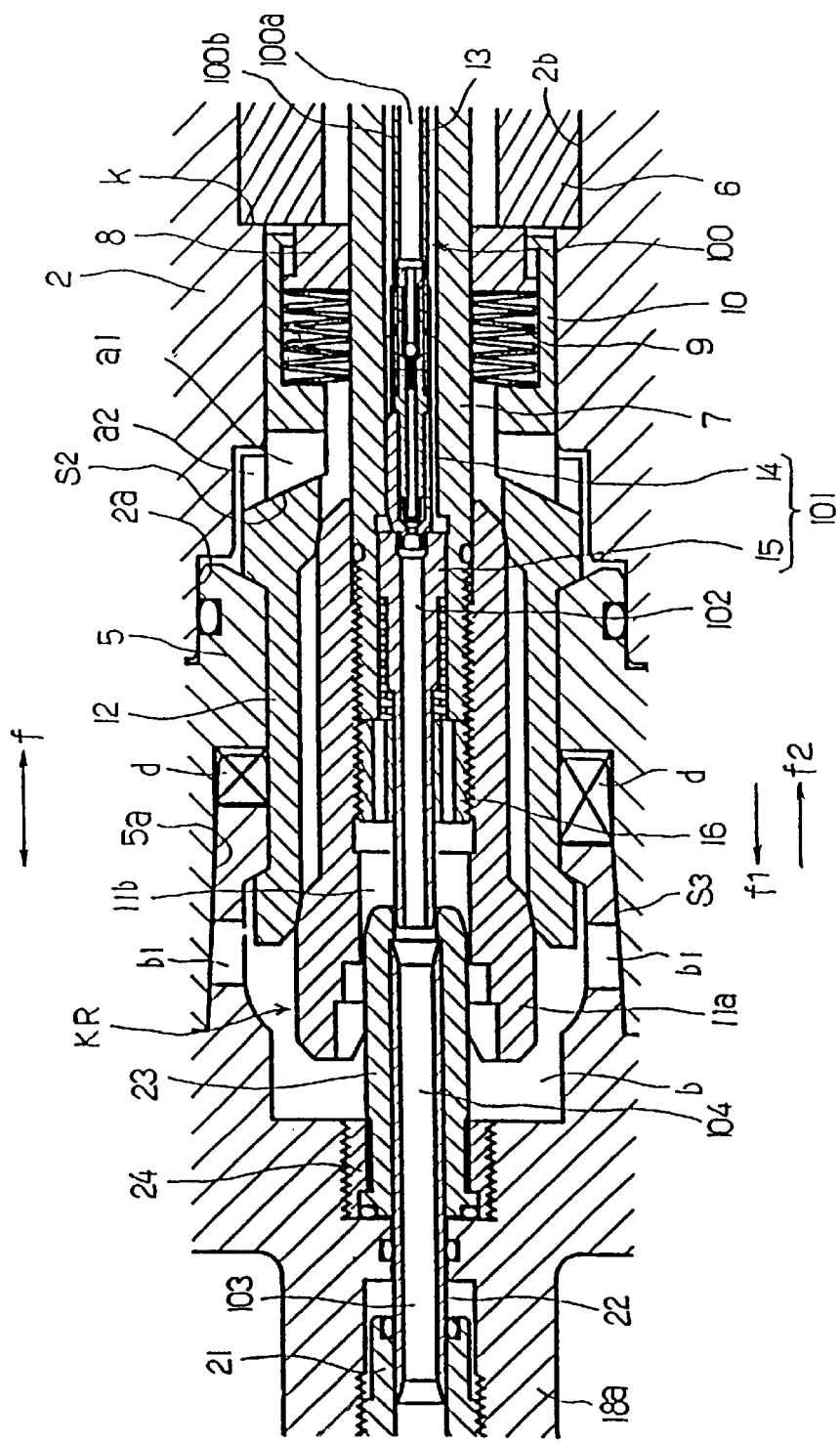
FIG. 2 is an enlarged side view of a main part of the above spindle device.
Figure 3:
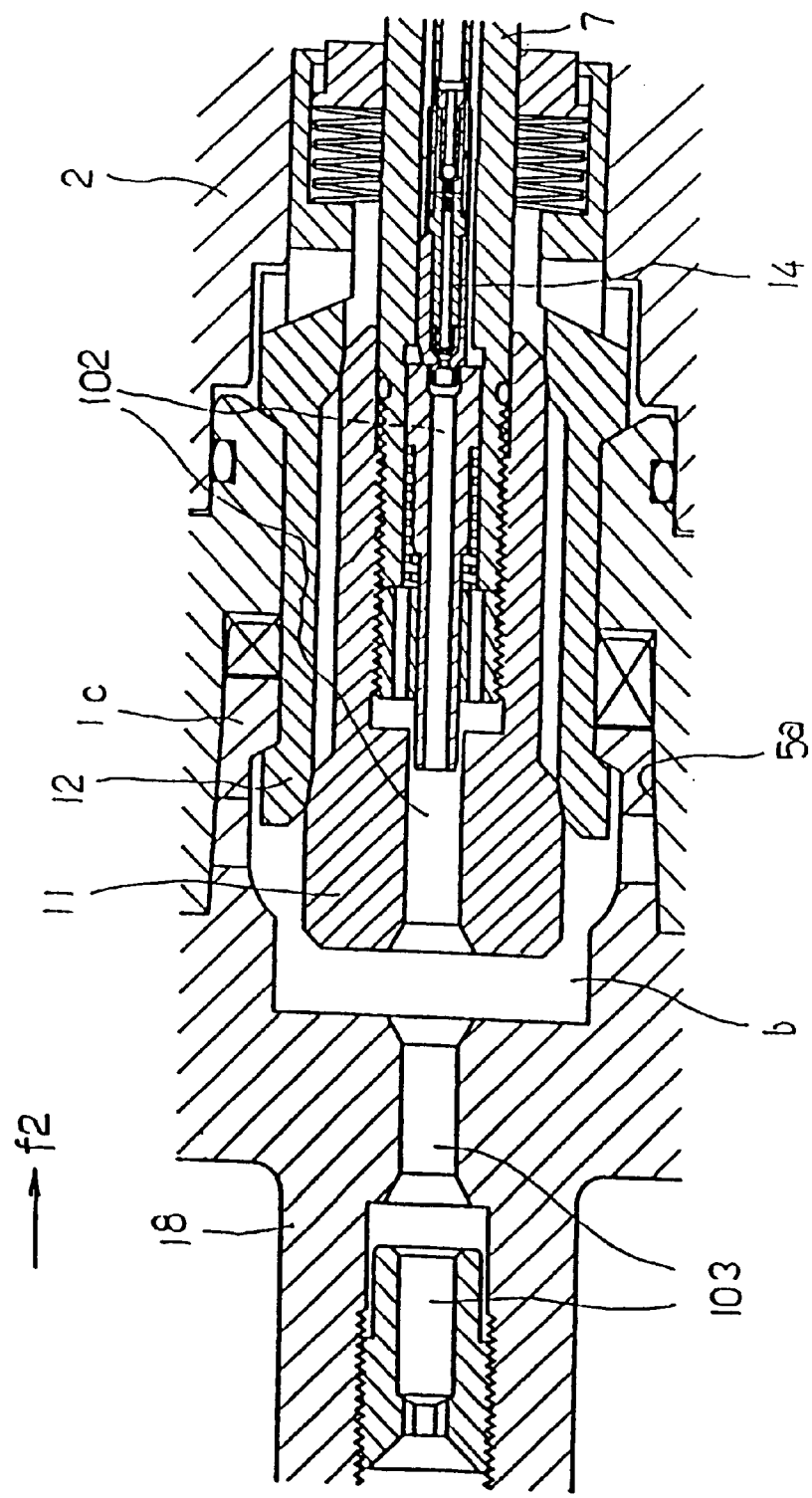
FIG. 3 is a sectional view at side sight of a part of the conventional spindle device of the machine tool
Figure 4:
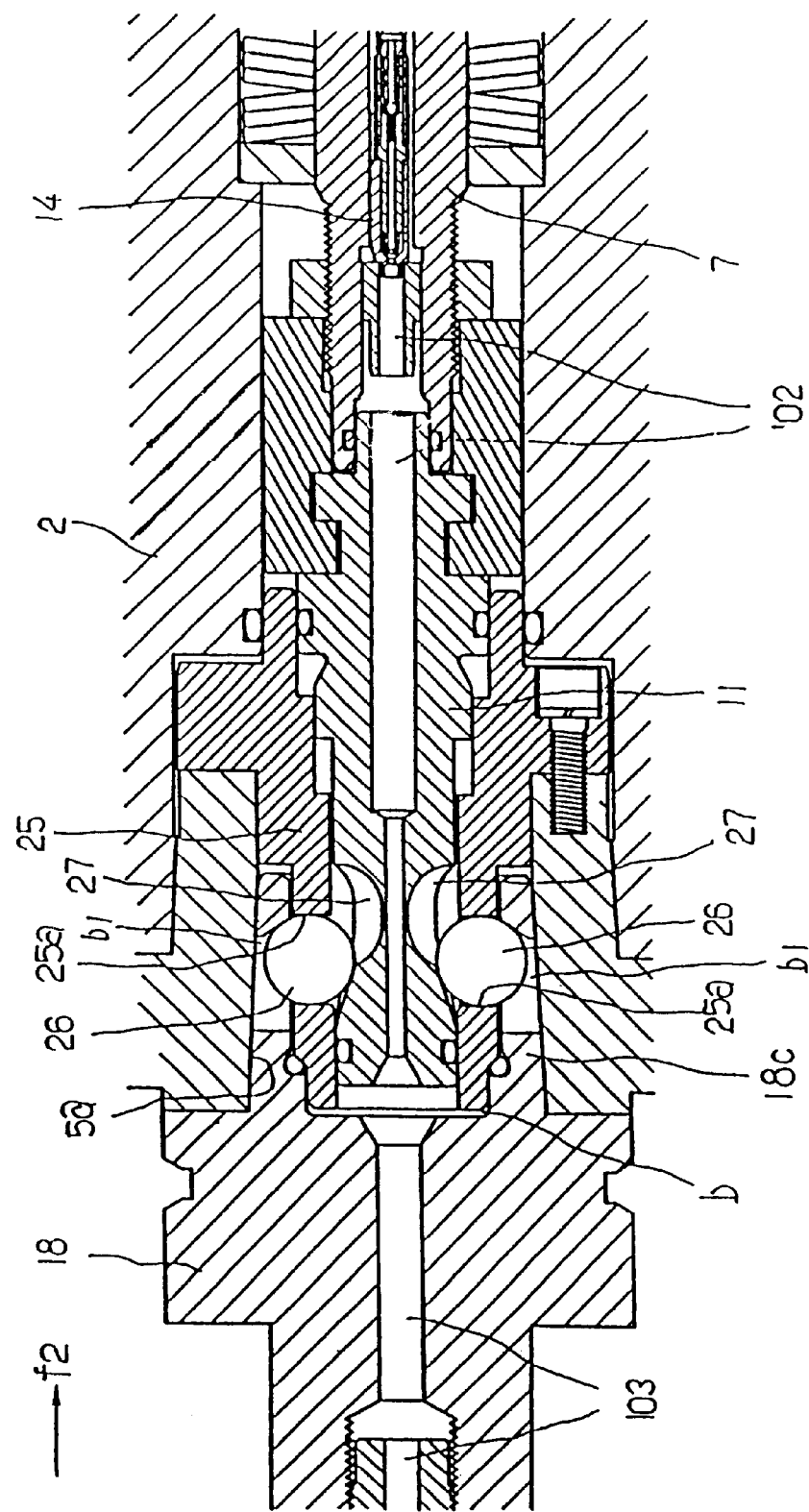
FIG. 4 is a sectional view at side sight of a part of the different spindle device of the conventional machine tool.

An explanation about the present invention will follow with reference to figures.

In the FIGS., 1 is a spindle supporting frame of a machine tool, 2 is a spindle which is rotatively supported by a bearing 3. Numeral 4 is a ring member to regulate each displacement of the bearing 3 and the spindle 2 in longitudinal direction "f", which is fixed on the front end face of the frame 1 by bolts.

Numeral 5 is a ring-shaped supporting member that is fitted on a comparative large diameter stepped hole 2a of the tip of the spindle 2, as well as that is fixed on the spindle 2 by bolts. The ring-shaped supporting member 5 has a flange end face s1 perpendicular to a spindle rotary center "c" on its front, as well as a tapered interfitted hole 5a in its center. Numeral 6 is a cylindrical guiding member that is inserted into a central hole 2b of the spindle 2, and keeps engaging the front end with a step "k" of the central hole 2b.

Clamping means KR are mounted on the inside of the spindle 2, namely materialized as follows.

A draw-bar 7 is inserted into a central hole of the cylindrical guiding member 6 so as to be displaced in the longitudinal direction "f", and a spring bracket 8 is externally fitted on the middle of the draw-bar 7 length so as to be supported on the front end of the cylindrical guiding member 6. A disk spring 9 is located in front of the spring bracket 8, and a pressing ring member 10 is inserted into the central hole of the spindle 2 so as to cover the disk spring 9 from the front. In this case, a longitudinal direction "f" slitting a1 is provided on the front of the pressing ring member 10, and the front end face forms a slope s2, and an outer periphery is guided so as to be free-slidably displaced to the longitudinal direction "f" by the central hole of the spindle 2.

A clamp-rod 11 is screwed on the tip of the draw-bar 7. The front end of the clamp-rod 11 forms an extensive part 11a, and front and back end faces of the extensive part 11a form slopes. Besides, the rear end face of the clamp-rod 11 forms a slope, and a stepped inner hole 11b is provided in the center of the clamp-rod 11. A collet 12 is located around the clamp-rod 11. The collet 12 is cylindrical, and not-illustrated longitudinal slittings are provided on its front at adequate intervals in circumferential direction. Besides, the front of the collet 12 is elastically deformed in radial direction, and the rear end thereof forms an extensive part. The front and back ends of the extensive part form slopes, and a slitting a2 is provided on the rear end. A bottom face of the slitting a2 forms a slope to contact with the above slope s2.

At the center of the above clamping means KR, are provided a gas-liquid passage 100, an atomizing means 101 and an in-spindle spray coolant passage 102. The gas-liquid passage 100 has an inner tube 13 which is located concentrically with a stepped inner hole provided in the center of the draw-bar 7. The inside of the inner tube 13 forms a coolant passage 100a, and an opening between an inner hole of the draw-bar 7 and the inner tube 13 forms a compressed air passage 100b. The atomizing means 101 comprises an atomizing nozzle 14 and a compressed air supplying valve 15. The atomizing nozzle 14 mixes and stirs coolant and compressed air which are supplied from the outside of the spindle 2 through the gas-liquid passage 100, and generates spray coolant. When pressure of the spray coolant spouted into the in-spindle spray coolant passage 102 in front of the nozzle 14 falls, the compressed air supplying valve 15 is displaced forward a little, and directly blows the compressed air within the compressed air passage 100b into the spray coolant. Here, the in-spindle spray coolant passage 102 forms an inner hole of the compressed air supplying valve 15.

In this case, the compressed air supplying valve 15 is formed in one having level difference of a large diameter portion and a small diameter portion. The small diameter portion is free-slidably inserted into an central hole of a joint screw 16 which is screwed on the inner hole of the clamp-rod 11. The compressed air supplying valve 15 is pressed backward f2 by elasticity of a spring 17 which is supported on the rear face of the joint screw 16 and the level difference, and closes a communicating position for the compressed air passage 100b. Besides, the joint screw 16 has small through holes around the central hole, and escapes leaked coolant and compressed air in a right place through the small through holes.

Numeral 18 is a tool holder that is fitted into the tapered interfitted hole 5a of the ring-shaped supporting member 5, and that is grasped by the clamping means KR.

The tool holder 18 comprises a holder body 18a, a holder grip 18b and a tapered interfitting axis 18c. A tool 19 is fixed on the tip of the holder body 18a, the holder grip 18b is grasped by a not-illustrated automatic tool exchange device, and the tapered interfitting axis 18c is fitted into the tapered interfitted hole 5a of the ring-shaped supporting member 5.

The holder body 18a has an inner hole at the center, and the tool 19 is inserted therein. The tool 19 is screwed by a tool fastener 20 mounted on the tip of the holder body 18a to be fixed. Two spray coolant passages 19a are provided in the center of the tool 19. The inner hole of the tool holder 18 forms a female screw, and a tool stopper 21 to support the rear end of the tool 19 is screwed therein.

The tapered interfitting axis 18c has a tapered male face s3 and a touch face s4 perpendicular to the central line thereof (which agrees with a spindle rotary center "c"). Besides, a comparative large diameter cavity "b" is provided in the center of the tapered interfitting axis 18c, and a plurality of circular holes b1 are provided to a peripheral wall thereof. In this case, the male face s3 and the touch face s4 are simultaneously pressed to the tapered interfitted hole 5a and the flange end face s1 to be bound integrally with the spindle 2. A slope is provided on the inner face of the cavity "b" so as to engage with the front end of the collet 12.

Besides, a notch "d" is provided on the rear end of the peripheral wall of the cavity "b".

An in-holder spray coolant passage 103 is provided in the center of the holder body 18a as well as in front of a bottom face s5 of the cavity "b". Concretely, a central hole is provided to the holder grip 18b, a communicating tube 22 is inserted thereinto, and the tip of the communicating tube 22 is closely inserted into a central hole of the stopper 21. Here, the front of the inner hole of the communicating tube 22 and the central hole of the stopper 21 form the in-holder spray coolant passage 103. In this case, the tip of the communicating tube 22 is relatively displaced in longitudinal direction of the stopper 21, thereby adjusting front and rear position of the tool 19.

Besides, an extension passage 104 is provided on the bottom face of the cavity "b" so as to extend the in-holder spray coolant passage 103 backward. Concretely, a mouthpiece member 23 in a fixed length is externally fitted on the rear of the communicating tube 22 projecting backward f2 from the bottom face of the cavity "b", and the front collar of the mouthpiece member 23 is fixed on the bottom face of the cavity "b" through a screw 24. In this case, the rear of the communicating tube 22 and the inside of the mouthpiece member 23 form the extension passage 104. When mounting the tool holder 18 on the spindle 2, the tip of the mouthpiece member 23 is nearly closely internal-inserted into the inner hole 11b of the clamp-rod 11, meanwhile it is nearly closely external-inserted on the front end of the small diameter part of the compressed air supplying valve 15.

In the above spindle device, when mounting or detaching the tool holder 18 to the spindle 2 side, first the draw-bar 7 is displaced forward f1. Hence, the clamp-rod 11 is displaced forward f1, thereby releasing the front of the collet 12 from being bound. Here, the front diameter of the collet 12 is reduced by elasticity of itself. Therefore, engagement between the collet 12 and the slope on the inner periphery of the cavity "b" is released, and besides, the tool holder 18 is also released from being grasped by the clamping means KR. Therefore, the tool holder 18 can be pulled out.

Under this condition, the not-illustrated automatic tool exchange device pulls the tool holder 18 forward f1, and then, fitly inserts a tapered interfitting axis 18c of a new tool. holder 18 into the tapered interfitted hole 5a of the ring-shaped supporting member 5 from the front.

Thereafter, the draw-bar 7 is displaced backward. Here, the extensive part 11a of the clamp-rod 11 engages with the front of the collet 12, and enlarges its diameter. Therefore, the front of the collet 12 engages with the slope of the inner periphery of the cavity "b". Besides, the collet 12 and the tapered interfitting axis 18c are displaced backward f2 against the elasticity of the disk spring 9. Therefore, the tapered male face s3 of the tapered interfitting axis 18c is pressed to the tapered interfitted hole 5a, and the touch face s4 is pressed to the flange end face s1, respectively. Here, the tool holder 18 is grasped by the clamping means KR.

During the spindle 2 rotating in the state that the tool holder 18 is grasped, when spouting the spray coolant from the tip of the tool 19, the compressed air and the coolant are respectively supplied from the outside of the spindle 2 into the gas-liquid passage 100 within the spindle 2. Thereafter, each part is operated as follows.

The gas-liquid passage 100 supplies the coolant and the compressed air to the atomizing nozzle 14. The atomizing nozzle 14 spouts them into the in-spindle spray coolant passage 102 of the inner hole of the compressed air supplying valve 15 as mixing and stirring, and generates the spray coolant. The in-spindle spray coolant passage 102 sends the spray coolant into the extension passage 104 through the mouthpiece member 23.

Next, the in-holder spray coolant passage 103 comprising the front of the communicating tube 22 and the central hole of the stopper 21 sends the spray coolant sent into the extension passage 104 into the spray coolant passage 19a within the tool 19. Hence, the spray coolant spouts from the tip of the tool 19.

In this case, since the in-spindle spray coolant passage is nearly closely communicated with the extension passage 104, the spray coolant is prevented from flowing out in plenty into the cavity "b" outside the extension passage 104. Therefore, the spray coolant is prevented scattering to the air in vain from the opening between the parts. Besides, since the in-spindle spray coolant passage 102, the extension passage 104 and the in-holder spray coolant passage 103 are hardly different in their diameters in the longitudinal direction, the spray coolant is prevented from liquefying due to the vast extension and reduction of the passage. Therefore, the spray coolant stably spouts from the tip of the tool 19.

Utility Value in the Industry

The present invention has the following effects.

According to the present invention, in the spindle device of the machine tool provided with the collet-clamping means, the in-spindle spray coolant passage, the in-holder spray coolant passage and the extension passage are hardly different in their diameters in longitudinal direction. Besides, since they are closely communicated with each other, the spray coolant passing these passages is prevented from liquefying due to the vast differences between their diameters. Therefore, the spray coolant stably spouts from the tip of the tool of the tool holder. Here, the spray coolant is prevented from flowing out the air through the opening between the parts, thereby effectively preventing from being wasted. Moreover, since the extension passage is provided to the tool holder, the structure of the conventional spindle side can be used as it is.

What is claimed is:

1. A spindle device of a machine tool composing:
    a spindle (2); and
    a tool holder (18) fixed on a tip of the spindle mechanically detachably through clamping means (KR),
    wherein a mouthpiece member (23) in a fixed length is protrudently installed on a bottom face of a cavity "b" provided in a center of the tool holder (18) with a screw (24);
    wherein a gas-liquid passage (100), an atomizing means (101) and an in-spindle spray coolant passage (102) are provided in a center recess of a draw-bar of the clamping means (KR) in a spindle side,
    the atomizing means (101) comprising an atomizing nozzle (14) and a compressed air supplying valve (15),
    the atomizing nozzle (14) mixing and stirring coolant and compressed air supplied from a source outside of the spindle through the gas-liquid passage (100) to generate a spray coolant, and
    the compressed air supplying valve (15) being mounted to be displaced forward when pressure of the spray coolant spouted into the in-spindle spray coolant passage (102) in front of the atomizing nozzle falls, the compressed air supplying valve directly blowing the compressed air within a compressed air passage (100b) into the spray coolant; and
    wherein the in-spindle spray coolant passage (102) comprises an inner hole of the compressed, air supplying valve (15), and the compressed air supplying valve has an end that contacts on the rear end of the mouthpiece member (23) of the tool holder (18).

2. A spindle device of a machine tool as set forth in claim 1, wherein an external form of the compressed air supplying valve (15) is formed integrally with a shoulder intermediate a large diameter portion and a small diameter portion, the small diameter portion being located in a central hole of a joint screw (16) fitted in an inner hole of a clamp-rod (11) of the clamping means (KR), and a spring (17) being provided between the joint screw (16) and the shoulder to elastically press the atomizing nozzle.

3. A spindle device of a machine tool as set forth in claim 1, wherein a tip of the small diameter portion of the compressed air supplying valve (15) is partially inserted into a rear end of the mouthpiece member (23) of the tool holder (18) in fastening the tool holder (18).

4. A spindle device of a machine tool as set forth in claim 2, wherein a tip of the small diameter portion of the compressed air supplying valve (15) is partially inserted into a rear end of the mouthpiece member (23) of the tool holder (18) in fastening the tool holder (18).

* * * * *